(12) United States Patent
Kruglick (10) Patent No.: US 8,902,853 B2
(45) Date of Patent: Dec. 2, 2014

(54) MAINTAINING SERVICE PRIORITY FOR MOBILE DEVICES DURING NETWORK HANDOFFS

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 495 days.

(21) Appl. No.: 13/266,104

(22) PCT Filed: May 27, 2011

(86) PCT No.: PCT/US2011/038316
§ 371 (c)(1),
(2), (4) Date: Oct. 24, 2011

(87) PCT Pub. No.: WO2012/166088
PCT Pub. Date: Dec. 6, 2012

(65) Prior Publication Data
US 2012/0300622 A1 Nov. 29, 2012

(51) Int. Cl.
*H04W 36/00* (2009.01)
*H04W 36/16* (2009.01)
*H04W 28/02* (2009.01)
*H04W 36/22* (2009.01)
*H04W 72/00* (2009.01)

(52) U.S. Cl.
CPC .......... *H04W 36/16* (2013.01); *H04W 36/0072* (2013.01); *H04W 36/22* (2013.01); *H04W 36/0066* (2013.01); *H04W 72/00* (2013.01); *H04W 28/0226* (2013.01); *H04W 28/0231* (2013.01)
USPC .......................................... 370/331; 455/437

(58) Field of Classification Search
None
See application file for complete search history.

(56) References Cited

U.S. PATENT DOCUMENTS

| 4,670,899 | A | * | 6/1987 | Brody et al. | 455/436 |
|---|---|---|---|---|---|
| 6,507,567 | B1 | * | 1/2003 | Willars | 455/436 |
| 2002/0085719 | A1 | * | 7/2002 | Crosbie | 455/436 |
| 2002/0126643 | A1 | * | 9/2002 | Forstadius et al. | 370/339 |
| 2004/0102194 | A1 | * | 5/2004 | Naghian et al. | 455/436 |
| 2004/0111236 | A1 | * | 6/2004 | Lee et al. | 702/179 |
| 2004/0233866 | A1 | * | 11/2004 | Bossoli et al. | 370/328 |
| 2006/0045049 | A1 | | 3/2006 | Chung et al. | |
| 2006/0199608 | A1 | * | 9/2006 | Dunn et al. | 455/552.1 |
| 2008/0026756 | A1 | * | 1/2008 | Harris et al. | 455/436 |
| 2008/0101300 | A1 | | 5/2008 | Oh | |
| 2009/0042572 | A1 | * | 2/2009 | Craig et al. | 455/436 |
| 2009/0305701 | A1 | * | 12/2009 | Giaretta et al. | 455/435.1 |
| 2010/0029275 | A1 | * | 2/2010 | Bosch et al. | 455/436 |
| 2010/0075680 | A1 | | 3/2010 | Ramachandran | |
| 2010/0248738 | A1 | * | 9/2010 | Chayat et al. | 455/453 |
| 2010/0322070 | A1 | * | 12/2010 | Wang et al. | 370/230 |
| 2011/0294509 | A1 | * | 12/2011 | Kim et al. | 455/436 |

OTHER PUBLICATIONS

Australia Patent Office, International Search Report and Written Opinion of the International Searching Authority for PCT/US2011/038316, prepared on Aug. 17, 2011, Australia.

Cheng, Sheng-Tzong et al., IPv6-based dynamic coordinated call admission control mechanism over integrated wireless networks, IEEE Journal on Selected Areas in Communications 23, No. 11 (Nov. 2005): pp. 2093-2103.

(Continued)

*Primary Examiner* — Timothy J Weidner
(74) *Attorney, Agent, or Firm* — Brundidge & Stanger, P.C.

(57) ABSTRACT

Implementations and techniques for maintaining service priority for mobile devices during network handoffs are generally discussed.

17 Claims, 6 Drawing Sheets

(56) References Cited

OTHER PUBLICATIONS

Mohanty, S. et al., A cross-layer (layer 2+3) handoff management protocol for next-generation wireless systems, IEEE Transactions on Mobile Computing 5, No. 10 (2006): 1347-1360.

Ferrus, R., Vertical handover support in coordinated heterogeneous radio access networks, Proceedings of the 14th IST Mobile and Wireless Communications Summit, Jun. 2005, Dresden, Germany, accessed online via http://www.eurasip.org/Proceedings/Ext/IST05/papers/430.pdf on Oct. 10, 2011.

Yanmaz, E et al., Dynamic load balancing and sharing performance of integrated wireless networks, IEEE Journal on Selected Areas in Communications, Jun. 2004, vol. 22, No. 5, pp. 862-872.

Handover, Wikipedia, last modified on Nov. 20, 2010, accessed online via http://en.wikipedia.org/wiki/Handover on Dec. 6, 2010.

Benmimoune et al., Vertical handoff between UMTS and WLAN, Proceedings of the 4th International Conference on Communications and Information Technology, Jul. 2010, pp. 131-140.

Anderson, Nate, "WiFi on steroids" gets final rules, drop spectrum sensing, Ars Technica website, Sep. 23, 2010, accessed online on Aug. 20, 2012 via http://arstechnica.com/tech-policy/2010/09/wifi-on-steroids-gets-final-rules-drops-spectrum-sensing/.

\* cited by examiner

500 A computer program product.

502 A signal bearing medium.

504 Machine-readable instructions, which, if executed by one or more processors, operatively enable a computing device to:

receive a download request and network visibility data from the mobile device;

determine that the download request is better handled by a target network than the communication network based at least in part on the network visibility data;

initiate a handoff request with the target network, wherein the handoff request is based at least in part on a restriction that limits the resources of the target network available to process the download request from the mobile device; and/or     maintain a service priority for the mobile device with the communication network while the mobile device is in communication with the target network.

| 506 a computer-readable medium. | 508 a recordable medium. | 510 a communications medium. |

MAINTAINING SERVICE PRIORITY FOR MOBILE DEVICES DURING NETWORK HANDOFFS

BACKGROUND

Unless otherwise indicated herein, the approaches described in this section are not prior art to the claims in this application and are not admitted to be prior art by inclusion in this section.

Many factors may lead to congestion in wireless networks including excessive traffic bursting, overbooking, rerouting, ingress policing, and more. Such congestion may increase stress on both bandwidth and buffering which in turn may cause delays and increased data loss that may lead to link dropping. Furthermore, wireless networks are increasingly required to support mobile devices having non-telephonic functionality, such as mobile telephones equipped with Global Positioning System (GPS) functionality, electronic book readers, gaming consoles, and the like. Many of these devices (such as GPS trackers in particular) attempt to maintain network connections for large fractions of the time while sending relatively little data and may be expected to place increased bandwidth demands on wireless networks.

One factor that may contribute to congestion in wireless networks includes mobile device "camping" (e.g., long term passive occupancy of a mobile device on the wireless networks). For example, the communication needs of a user on a wireless network (e.g., video streaming or large file download) might be better handled by a second wireless network sharing an overlapping coverage area. However, a few high impact users with camping can dramatically impact bandwidth needs. Accordingly, such a second network may not desire to permit camping (e.g., based on traffic models, statistical expectations, or customer relationship). For example the Long Term Evolution (LTE) standard has a signal in the System Information Block (SIB) SIB1 specifically to indicate whether "camping" (e.g., long term occupancy) is allowable or not.

SUMMARY

Some example methods, apparatus, and systems described herein may relate to maintaining service priority for mobile devices during network handoffs.

Some example methods may be implemented in a communication network associated with a mobile device. Such methods may include receiving a download request and network visibility data from the mobile device. A determination may be made that a target network better handles the download request than the communication network. Such a determination may be based at least in part on the network visibility data. A handoff request may be initiated with the target network, where the handoff request may be based at least in part on a restriction that limits the resources of the target network available to process the download request from the mobile device. A service priority may be maintained for the mobile device with the communication network while the mobile device is in communication with the target network.

Some example methods may be implemented in a mobile device associated with a communication network. Such methods may include determining, via the mobile device, that a target network better handles a download request than the communication network. Such a determination may be based at least in part on network visibility data available to the mobile device. A handoff request may be initiated, via the mobile device, with the target network, where the handoff request may be based at least in part on a restriction that limits the resources of the target network available to process the download request from the mobile device. A beacon signal may be transmitted, via the mobile device, to maintain a service priority for the mobile device with the communication network while the mobile device is in communication with the target network.

Some example apparatus and systems related to maintaining service priority for mobile devices may be implemented in a mobile service provider portion of a communication network. Such a mobile service provider may be configured to facilitate communication in the communication network associated with a mobile device. The mobile service provider may be further configured to receive a download request and network visibility data from the mobile device. The mobile service provider may determine that the download request is better handled by a target network than the communication network based at least in part on the network visibility data. The mobile service provider may initiate a handoff request with the target network, where the handoff request may be based at least in part on a restriction that limits the resources of the target network available to process the download request from the mobile device. The mobile service provider may maintain a service priority for the mobile device with the communication network while the mobile device is in communication with the target network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to maintaining service priority for mobile devices during network handoffs.

Some examples discussed below may relate to short-term handoffs from a first network (e.g., a communication network) to a second network (e.g., a target network) for the purpose of more efficiently handling a specific computing need. For example, when downloading a file, such a target network may be able to perform the download faster than the communication network that a user's mobile device is currently on. Such target networks may not allow long-term connections based on such handoffs, but may allow a short-term connection for a specific purpose or time.

Figure 1:
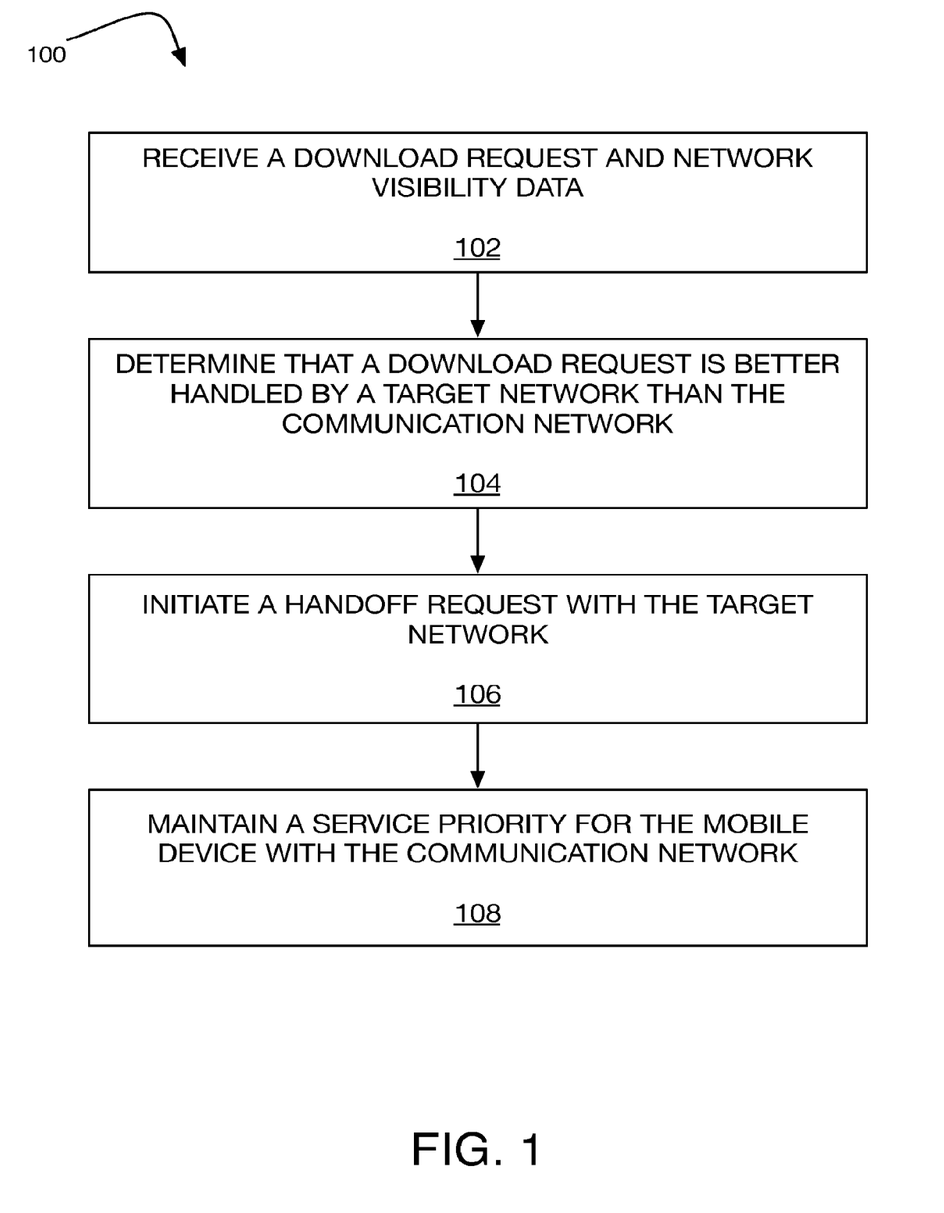
FIG. 1 illustrates an example process for maintaining service priority for mobile devices during network handoffs that is arranged in accordance with at least some embodiments of the present disclosure.

FIG. 1 illustrates an example process for maintaining service priority for mobile devices during network handoffs that is arranged in accordance with at least some embodiments of the present disclosure. Process 100, and other processes described herein, set forth various functional blocks or actions that may be described as processing steps, functional operations, events and/or acts, etc., which may be performed by hardware, software, and/or firmware. Those skilled in the art in light of the present disclosure will recognize that numerous alternatives to the functional blocks shown in FIG. 1 may be practiced in various implementations. For example, although process 100, as shown in FIG. 1, may comprise one particular order of blocks or actions, the order in which these blocks or actions are presented does not necessarily limit claimed subject matter to any particular order. Likewise, intervening actions not shown in FIG. 1 and/or additional actions not shown in FIG. 1 may be employed and/or some of the actions shown in FIG. 1 may be eliminated, without departing from the scope of claimed subject matter. Process 100 may include one or more of functional operations as indicated by example operations 102, 104, 106 and/or 108.

As illustrated, process 100 may be implemented for maintaining service priority for mobile devices during network handoffs. Process 100 may be implemented in a communication network associated with a plurality of mobile devices (see FIG. 3). Processing may begin at operation 102, "receive a download request and network visibility data", where a download request and network visibility data may be received, either separately or simultaneously. For example, a download request and network visibility data may be received from the mobile device. Such a download request may include a request for a raw text download, streaming video download, a relatively large file download, a file download of a particular format or type, or the like.

As used herein the term "network visibility data" may refer to received signal strength (e.g., received signal strength indicator RSSI), network type, Network ID, the like, and/or combinations thereof. Additionally or alternatively, "network visibility data" may refer to handoff calculation data (e.g., data associated with operation 104, described below), where such handoff calculation data might be included as base stations of a communication network may pass such handoff calculation data through the mobile devices. For example, the mobile device may have network visibility data related to any number of networks, such as the communication network, the target network, and/or other potential target networks.

Processing may continue from operation 102 to operation 104, "determine that a download request is better handled by a target network than the communication network", where a determination may be made that a download request is better handled by a target network than the communication network. For example, such a determination may be based at least in part on the network visibility data.

In some examples, such a determination that the target network better handles the download request may be further based at least in part on data associated with the download request. For example, such data associated with the download request may include a file type of the download request, a file size of the download request, stream type and/or duration, buffer size, a count of services, Cascading Style Sheets (CSS) data, the like, and/or combinations thereof. For example, a determination may be made whether another network visible to the mobile device can handle a specific file type more efficiently or may be able to handle large amounts of data more efficiently than the communication network.

Processing may continue from operation 104 to operation 106, "initiate a handoff request with the target network", where a handoff request with the target network may be initiated. For example, a handoff request may be initiated with the target network, where the handoff request may be based at least in part on a restriction that limits the resources of the target network available to process the download request from the mobile device. For example, the target network may declare that the target network is only open to short-term residence. In such a case, the determination at operation 104 (e.g., a decision that a download request is better handled by a target network) may be made based on the ability to fulfill a given request within the restrictions that limit the resources of the target network, for example. In such a case, an initiated handoff request may imply such restrictions. Alternatively, in cases where a determination is made that the download request is not better handled by a target network, the communication network may process the download request from the mobile device instead of handing off to the target network.

In some examples, such a restriction that limits the resources of the target network available to process the download request from the mobile device may include a time restriction for the download request, a size restriction for the download request, a specified data rate, a restriction on specific service types (e.g., Assisted Global Positioning System (aGPS)), the like, and/or combinations thereof. For example, such a time restriction may allow for a short-term connection having a defined time frame (e.g., fifteen seconds, an estimated amount of time to upload a 10 MB sized file, or the like). The target network itself may prohibit the mobile device from having camping occupancy on the target network. Such a prohibition on camping occupancy may prohibit long-term occupancy, open-ended occupancy, persistent occupancy, or the like. Accordingly, such a restriction that limits the resources of the target network available to process the download request from the mobile device may be configured to not trigger occupancy prohibitions. As discussed above, in some examples, the determination at operation 104 (e.g., a decision that a download request is better handled by a target network) may be made based on the ability to fulfill a given request within the restrictions that limit the resources of the target network. In such a case, such restrictions may be communicated to the mobile device from the target network and may be included in the network visibility data communicated to the communication network at operation 102, for example. For example, a Long Term Evolution (LTE)-type target network may utilize a broadcast signal in the SIB1 (System Information Block) to indicate whether camping (e.g., long-term occupancy) is allowable or not.

As used herein, the term "handoff" may refer to a process of transferring an ongoing call or data session from one channel connected to a network to another channel on the network, or from a first network to a second network.

In some examples, the handoff request may comprise a pre-reversed handoff request. As used herein the term "pre-reversed handoff request" may refer to handoff request that includes instructions for both passing service for a mobile device from the communication network to the target network as well as passing service from the target network back to the communication network. For example, such a pre-reversed handoff request may include a first portion designating a forward handoff from the communication network to the target network, and/or a second portion designating a reverse handoff from the target network to the communication network. The download request may be implied via the handoff request, or the mobile device may send the download request to the target network upon transfer of service to the target network has occurred.

Such pre-reversed handoffs may operate in conjunction with the restrictions that limits the resources of the target network available to process the download request. For example, the second portion of a pre-reversed handoff designating a reverse handoff from the target network to the communication network may occur based on time-based restrictions for the download request. Alternatively, task-based restrictions for the download request (e.g., file size-based restrictions) may be implemented where the exact timing of the second portion of a pre-reversed handoff is not known (e.g., because the time required to complete the task is not known) but the demand until the task is done is known (e.g., file download).

In some examples, the initiating of the pre-reversed handoff request with the target network may be sent directly from the communication network to the target network. In other examples, the initiating of the pre-reversed handoff request with the target network may be sent from the communication network to the target network via the mobile device.

Processing may continue from operation 106 to operation 108, "maintain a service priority for the mobile device with the communication network", where a service priority for the mobile device with the communication network may be maintained. For example, a service priority may be maintained for the mobile device with the communication network while the mobile device is in communication with the target network.

In some examples, maintaining a service priority for the mobile device with the communication network may be based at least in part on the communication network operating network admissions and controls as if the mobile device were present on the communication network while inactive. Additionally or alternatively, maintaining a service priority may be based at least in part on the communication network retaining information associated with the mobile device. For example the communication network may retain a validation associated with the mobile device, an address associated with the mobile device, the like, and/or combinations thereof.

In operation, a handoff request of process 100 may be utilized for short-term handoffs to the target network for the purpose of efficiently handling a specific communication need. For example, a pre-reversed handoff request may allow the mobile device to temporarily connect to the target network, perform a desired function, and quickly re-connect with the communication network that the mobile device was previously on. The connection with the communication network may be maintained (e.g., held) by the communication network. For example, the connection with the communication network may be maintained by the communication network retaining validations, addresses, and other related information to allow the mobile device to re-connect to the communication network. As will be described in greater detail below, when a reactivate connection request from the target network to the communication network occurs, the communication network may already have the mobile device profile and may have pre-agreed to take the hand-back from the target network. Should an emergency event preclude the hand-back to the communication network, the target network may subject the mobile device to admission rules as if the mobile device was newly applying for access.

In some examples, the communication network and the target network may be different network types. For example, the communication network and the target network may be wide area and small area network types, broadband and voice network types, or the like. For example, an incoming batch of text may take substantially longer on an Enhanced Data rates for GSM Evolution network (EDGE) or a 3rd generation mobile telecommunications network (3G) versus a WiFi™ network (or microwave access networks (WiMax) or Long Term Evolution networks (LTE), for example). Therefore, a mobile device connected an EDGE-type communication network and downloading a text block may have a faster experience if the mobile device could obtain the text block via a WiFi™-type target network, even if the connection to the WiFi™-type target network was a temporary short-term connection due to permissions or traffic. Further, the total power spent may also be less, despite a higher power use of WiFi™-type target networks, as a WiFi™-type target network may achieve higher bits-per-watt hour. Accordingly, process 100, and other processes described herein, may facilitate short-term and/or defined-time use of alternative target networks.

In some examples, the communication network and the target network may be of the same network types. In such an example, a handoff request of process 100 may be utilized between the same types if one network has better coverage and/or lower usage. In such an example, such a handoff request may be pre-reversed in cases where the network receiving the handoff request belongs to another company, for example.

Additionally or alternatively, process 100 may be utilized to reduce long-term power consumption. For example, a WiFi™-type mobile device might drop to a ZigBee®-type target network (much lower long term power use) until the WiFi™-type mobile device needs to upload and then reverse the handoff. In such a case, a ZigBee®-type target network may permit a lower long-term power use as compared to a WiFi™-type communication network. In such a case, the occupancy on such a target network might be limited by bandwidth-type or data total-type restriction (e.g., as compared to duration-type restriction).

Additionally or alternatively, process 100 may be utilized to relieve congestion. For example, a mobile device might shift from a Long Term Evolution networks (LTE)-type communication network to an LTE-type target network on another frequency temporarily in order to relieve congestion, even where the mobile device might be limited by time-type restrictions or action-type restrictions. In another example, if a given tower in a cell-type communication network has reasonable capacity now but is expecting to receive a handoff of several people from another tower in the cell-type communication network, it may make sense to handoff a mobile device that is about to start a streaming video download.

Referring to the example above relating to the download of raw text via an EDGE network compared to a WiFi™ network, an incoming batch of raw text may take substantially longer to transfer on an EDGE network compared to a WiFi™ network. To decrease user wait-time, a handoff of process 100 may be initiated with the WiFi™ network in this case, for example. The WiFi™ network may provide a short-term connection specifically for the raw text download.

Figure 2:
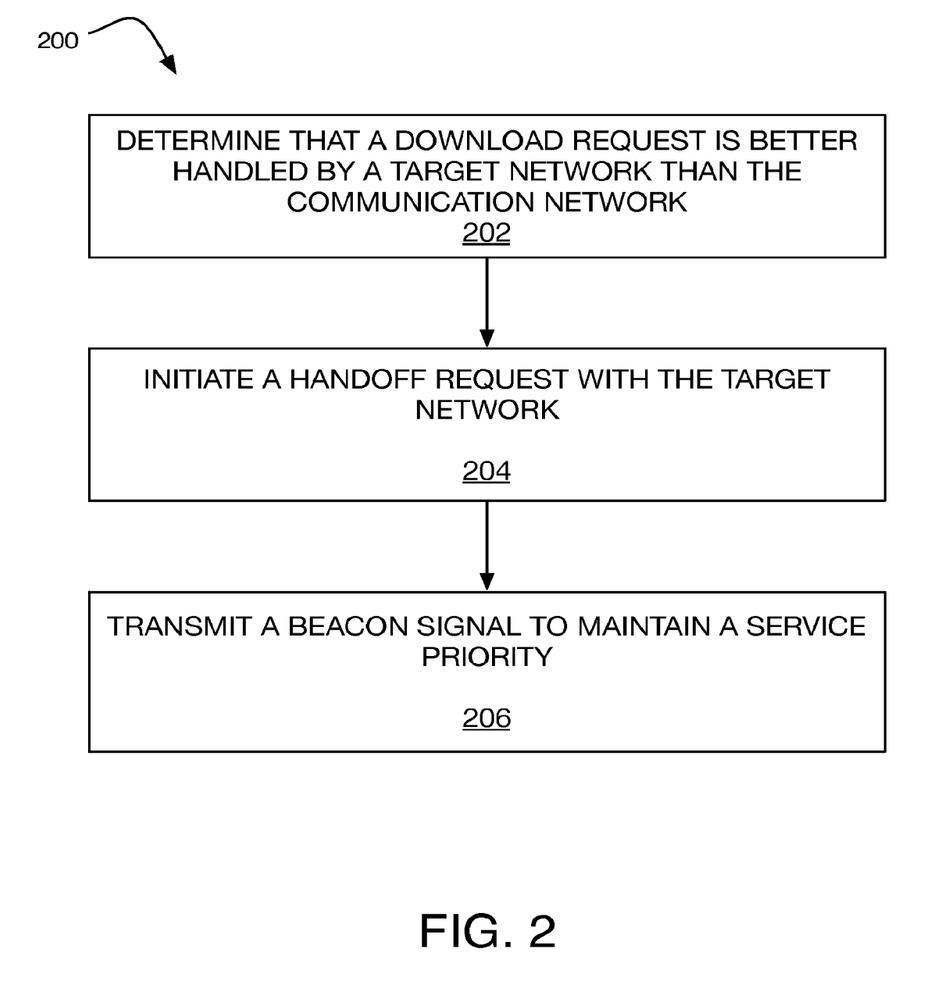
FIG. 2 illustrates another example process for maintaining service priority for mobile devices during network handoffs that is arranged in accordance with at least some embodiments of the present disclosure.

FIG. 2 illustrates another example process for maintaining service priority for mobile devices during network handoffs that is arranged in accordance with at least some embodiments of the present disclosure. As illustrated, process 200 may be implemented for maintaining service priority for mobile devices during network handoffs.

Figure 3:
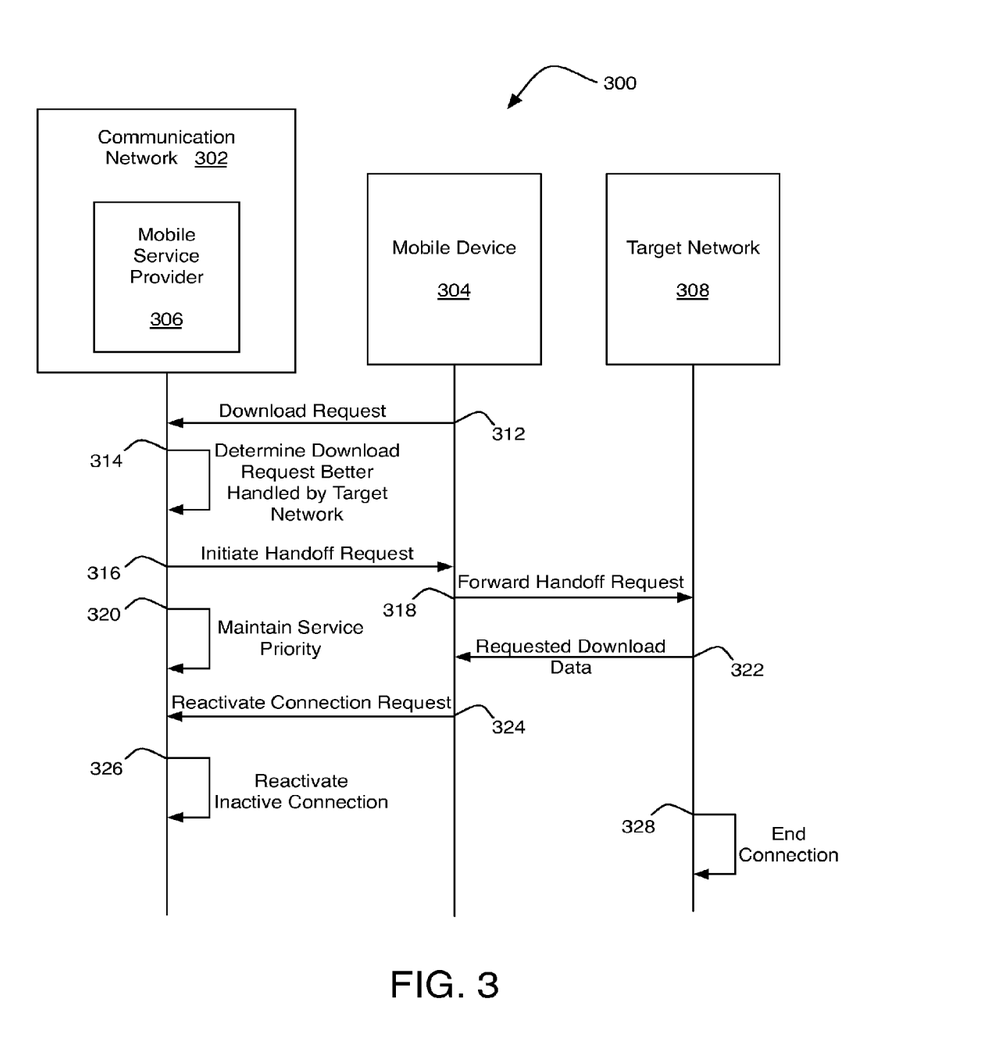
FIG. 3 illustrates a further example process for maintaining service priority for mobile devices during network handoffs that is arranged in accordance with at least some embodiments of the present disclosure.

Process 200 may be implemented in a mobile device associated with a communication network (see FIG. 3). Processing may begin at operation 202, "determine that a download request is better handled by a target network than the communication network", where a determination may be made that a download request is better handled by a target network than the communication network. For example, such a determination, via the mobile device, may be based at least in part on the network visibility data available to the mobile device. In some examples, the communication network and the target network may be different network types.

Processing may continue from operation 202 to operation 204, "initiate a handoff request with the target network", where a handoff request with the target network may be initiated. For example, a handoff request may be initiated, via the mobile device, with the target network, where the handoff request may be based at least in part on a restriction that limits the resources of the target network available to process the download request from the mobile device. Alternatively, in cases where a determination is made that the download request is not better handled by a target network, the communication network may process the download request from the mobile device instead of handing off to the target network.

In some examples, the handoff request may comprise a pre-reversed handoff request. For example, such a pre-reversed handoff request may include a first portion designating a forward handoff from the communication network to the target network, and/or a second portion designating a reverse handoff from the target network to the communication network.

Processing may continue from operation 204 to operation 206, "transmit a beacon signal to maintain a service priority", where a beacon signal may be transmitted to maintain a service priority. For example, a beacon signal may be transmitted to maintain a service priority for the mobile device with the communication network while the mobile device is in communication with the target network. Additional details regarding the operation of process 200 may be the similar or the same as process 100, as described above.

FIG. 3 illustrates a further example process for maintaining service priority for mobile devices during network handoffs that is arranged in accordance with at least some embodiments of the present disclosure. As illustrated, communication network 302 may be implemented for routing communications via a plurality of mobile devices 304 and a mobile service provider 306.

As used herein the term "communication network" may refer to any number of communication systems including a plurality of mobile devices adapted for wireless communication with one another via the communication network. For example, such a communication network 302 may refer to any number of communication systems including one or more of the following: a cellular phone network, a WiFi™ network, a pico-cell network, an Enhanced Data rates for GSM Evolution network (EDGE), a 3rd generation mobile telecommunications network (3G), a mobile worldwide interoperability for microwave access network (WiMax), a voice over Internet protocol (IP) system (e.g., via a wireless local area network (WLAN), a wireless wide area network (WWAN)), a Long Term Evolution network (LTE), wideband-CDMA (WCDMA), Evolution-Data Optimized or Evolution-Data (EVDO), Orthogonal Frequency-Division Multiple Access network (OFDMA), the like, and/or combinations thereof, according to the particular application. Additionally or alternatively, such a communication network 302 may refer to any number of communication systems that provide Internet access to a plurality of mobile devices.

As used herein the term "target network" may refer to any number of communication systems (e.g., such as those described above with regard to the communication network) that are adapted for wireless communication with a plurality of mobile devices.

Communication network 302 may include one or more mobile devices 304. Mobile devices 304 may be arranged (e.g., coupled) in communication with mobile service provider portion 306 of communication network 302. As used herein the term "mobile device" may refer to mobile devices such as a cell phone, a personal data assistant (PDA), the like, and/or combinations thereof, for example.

As used herein the term "mobile service provider" may refer to a mobile service provider portion of communication network such as a central management center, a mobile phone network operator, or the like that is configured to facilitate communication among a plurality of mobile devices. Communication network 302 is presented herein purely for illustrative purposes and it may be recognized that communication network 302 may have additional components that have not been depicted in FIG. 3 in the interest of clarity. Accordingly, mobile service provider 306 may include any number of components of communication network 302 that an are not illustrated here, such as one or more base stations, base station controller, mobile switching center, the like, and/or combinations thereof.

As illustrated, process 300 may be implemented for maintaining service priority for mobile devices (e.g., mobile device 304) during network handoffs. Process 300 may be implemented in a mobile service provider 306 configured to facilitate communication in communication network 302 associated with mobile device 304. Processing may begin at operation 312, "download request", where a download request and network visibility data may be received, either separately or simultaneously. For example, a download request and network visibility data may be received from mobile device 304 via mobile service provider 306.

Processing may continue from operation 312 to operation 314, "determine download request better handled by target network", where a determination may be made that a download request is better handled by target network 308 than communication network 302. For example, such a determination may be based at least in part on the network visibility data.

Processing may continue from operation 314 to operation 316, "initiate a handoff request", where a handoff request with target network 308 may be initiated. For example, a handoff request may be initiated via communication network 302 and sent from communication network 302 to target network 308 via mobile device 304. Alternatively, in some examples, the initiating of the pre-reversed handoff request with target network 308 may be sent directly from communication network 302 to target network 308. Additionally, a handoff request may involve several back and forth coordination-type communications (e.g., "negotiations"), where the final step is establishing a connection between mobile device 304 and target network 308.

Such a handoff request may be based at least in part on a restriction that limits the resources of target network 308 available to process the download request from the mobile device. Alternatively, in cases where a determination is made that the download request is not better handled by target network 308, communication network 302 may process the download request from mobile device 304 instead of handing off to target network 308.

Processing may continue from operation 316 to operation 318, "forward handoff request", where a handoff request may be sent to target network 308 from mobile device 304. For example, a handoff request may be forwarded from communication network 302 to target network 308 via mobile device 304. In such an example, a handoff request can go straight from mobile service provider 306 to target network 308 over a command channel (e.g., an X2-type channel), for example.

Processing may continue from operation 318 to operation 320, "maintain service priority", where a service priority for mobile device 304 with communication network 302 may be maintained. For example, a service priority may be maintained for mobile device 304 with communication network 302 while mobile device 304 is in communication with target network 308.

Processing may continue from operation 320 to operation 322, "requested download data", where requested download data may be received by mobile device 304. For example, the requested download data may be received by mobile device 304 from target network 308.

Processing may continue from operation 322 to operation 324, "reactivate connection request", where a reactivate connection request may be received by communication network 302. For example, a reactivate connection request may be received by communication network 302 from mobile device 304. In some examples, such a reactivation connection request may be triggered upon completion of receiving the download data from target network 308 (or termination of the download) via mobile device 304. Such a reactivation connection request may be based at least in part on the maintained service priority at communication network 302. As illustrated, the reactivate connection request may be initiated via mobile device 304 and/or may be communicated directly to communication network 302 from mobile device 304. Alternatively, the reactivate connection request may be initiated via target network 308 and/or may be communicated directly to communication network 302 from target network 308.

Processing may continue from operation 324 to operation 326, "reactivate inactive connection", where an inactive connection may be reactivated by communication network 302. For example, communication network 302 may reactivate an inactive connection between mobile device 304 and communication network 302 based at least in part on the received reactivate connection request.

At operation 328, "end connection", the connection between target network 308 and mobile device 304 may be ended. For example, the connection between target network 308 and mobile device 304 may be ended any time after transfer of the download data from target network 308 (or termination of the download).

In operation, process 300 may promote overall network efficiency by allowing a given task to be performed by a better-suited network, which may reduce network congestion among all participating networks. Additionally, process 300 may improve user experience, because actions of mobile device 304 may be performed faster than they otherwise would be if mobile device 304 was restricted to a single network. Additional details regarding the operation of process 300 may be the similar or the same as process 100 and/or process 200, as described above.

Next-generation wireless networks may support a wide range of high-speed data services such as wideband-CDMA (WCDMA), Evolution-Data Optimized or Evolution-Data (EVDO) and WiMAX, for example. These new networks may overlap with older infrastructure and more localized infrastructure such as pico-cells and WiFi™ networks, for example. In some examples described herein, communication network 302 and target network 308 may be different network types. For example, a handoff of process 300 may occur between an EDGE-type communication network 302 and a WiFi™-type target network 308.

In such an example, mobile device 304 may be initially connected to EDGE-type communication network 302. Mobile device 304 may request a raw text download from EDGE-type communication network 302. EDGE-type communication network 302 may determine that downloading the raw text would be more efficiently handled by WiFi™-type target network 308, using network visibility data reported by mobile device 304 or other sources. EDGE-type communication network 302 may send a pre-reversed handoff initiation to mobile device 304. The connection with EDGE-type communication network 302 may be maintained (e.g., held). For example, EDGE-type communication network 302 may retain validations, addresses, and other related information needed to take mobile device 304 back, and operate network admission and controls as if mobile device 304 were present on EDGE-type communication network 302 but inactive.

In such an example, mobile device 304 or EDGE-type communication network 302 may send a pre-reversed handoff request to WiFi™-type target network 308. WiFi™-type target network 308 may service the download of the requested raw text, and then end the connection with mobile device 304. Mobile device 304 or WiFi™-type target network 308 may send a re-connect request to EDGE-type communication network 302. The connection with EDGE-type communication network 302 may be re-enabled. Reentry of mobile device 304 onto EDGE-type communication network 302 may be ensured, given that the connection was maintained (e.g., held).

Figure 4:
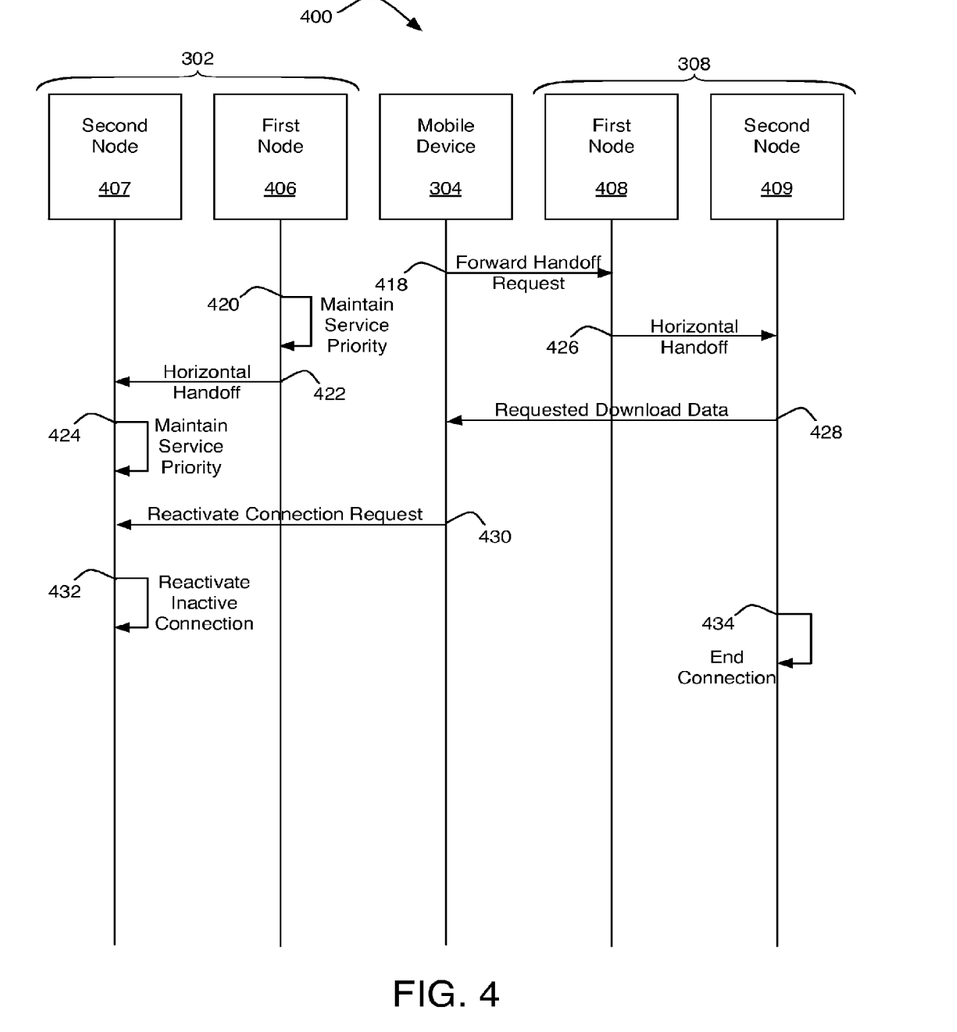
FIG. 4 illustrates a still further example process for maintaining service priority for mobile devices during network handoffs that is arranged in accordance with at least some embodiments of the present disclosure.

FIG. 4 illustrates a still further example process for maintaining service priority for mobile devices during network handoffs that is arranged in accordance with at least some embodiments of the present disclosure. As illustrated, communication network 302 may include a first node 406, a second node 407, etc. Similarly, target network 308 may include a first node 408, a second node 409, etc.

As illustrated, process 400 may be implemented for maintaining service priority for mobile devices (e.g., mobile device 304) during network handoffs. Processing may begin at operation 418, "forward handoff request", where a handoff request may be sent to first node 408 of target network 308 from mobile device 304. For example, a handoff request may be forwarded from first node 406 of communication network 302 to target network 308 via mobile device 304.

Processing may continue from operation 418 to operation 420, "maintain service priority", where a service priority for mobile device 304 with first node 406 of communication network 302 may be maintained. For example, a service priority may be maintained for mobile device 304 with first node 406 of communication network 302 while mobile device 304 is in communication with target network 308.

Processing may continue from operation 420 to operation 422, "horizontal handoff", where a horizontal handoff may be conducted. For example, first node 406 of communication network 302 may conduct a horizontal handoff with second node 407 of communication network 302. For example such a horizontal handoff may include a transfer of service for mobile device 304 from first node 406 of communication network 302 to second node 407 of communication network 302. In such an example, horizontal handoff 422 may include instructions for second node 407 of communication network 302 to establish and/or maintain service priority for mobile device 304. For example, such a horizontal handoff may be done for congestion handling and/or may be done due to changing location of the mobile device 304.

Processing may continue from operation 422 to operation 424, "maintain service priority", where a service priority for mobile device 304 with second node 407 of communication network 302 may be maintained. For example, upon the horizontal handoff from first node 406 to second node 407, a service priority may be maintained for mobile device 304 with second node 407 of communication network 302 while mobile device 304 is in communication with target network 308. Additionally or alternatively, upon the horizontal handoff from first node 406 to second node 407, a service priority may no longer be maintained for mobile device 304 with first node 406 of communication network 302.

In addition (or in the alternative) to the horizontal handoff illustrated by operation 422, processing may continue from operation 418 to operation 426, "horizontal handoff", where a horizontal handoff may be conducted. For example, first node 408 of target network 308 may conduct a horizontal handoff with second node 409 of target network 308. For example such a horizontal handoff may include a transfer of service for mobile device 304 from first node 408 of target network 308 to second node 409 of target network 308. Such a transfer of service for mobile device 304 from a first node 408 of target network 308 to second node 409 of target network 308 may occur at least during the processing of the download request. In such an example, horizontal handoff 426 may include instructions for second node 409 of target network 308 to download data to mobile device 304 and/or to initiate a request to reactivate connection between mobile device 304 and communication network 302. For example, such a horizontal handoff may be done for congestion handling and/or may be done due to changing location of the mobile device 304.

Processing may continue from operation 426 to operation 428, "requested download data", where requested download data may be received by mobile device 304. For example, the requested download data may be received by mobile device 304 from second node 409 of target network 308.

Processing may continue from operation 428 to operation 430, "reactivate connection request", where a reactivate connection request may be received by second node 407 of communication network 302. For example, a reactivate connection request may be received by second node 407 of communication network 302 from mobile device 304. In some examples, such a reactivation connection request may be triggered upon completion of receiving the download data from target network 308 (or termination of the download) via mobile device 304. Such a reactivation connection request may be based at least in part on the maintained service priority at second node 407 of communication network 302. As illustrated, the reactivate connection request may be initiated via mobile device 304 and/or may be communicated directly to second node 407 of communication network 302 from mobile device 304. Alternatively, the reactivate connection request may be initiated via second node 409 of target network 308 and/or may be communicated directly to communication network 302 from second node 407 of target network 308.

Processing may continue from operation 430 to operation 432, "reactivate inactive connection", where an inactive connection may be reactivated by second node 407 of communication network 302. For example, second node 407 of communication network 302 may reactivate an inactive connection between mobile device 304 and communication network 302 based at least in part on the received reactivate connection request.

At operation 434, "end connection", the connection between second node 409 of target network 308 and mobile device 304 may be ended. For example, the connection between second node 409 of target network 308 and mobile device 304 may be ended any time after transfer of the download data from second node 409 of target network 308 (or termination of the download).

In operation, such horizontal handoffs between first node 406 and second node 407 of communication network 302 and/or between first node 408 and second node 409 of target network 308 may occur for various reasons. For example, such horizontal handoffs may be based at least in part on the location of mobile device 304, load balancing between such nodes, or the like.

Additional details regarding the operation of process 400 may be the similar or the same as process 100, process 200, and/or process 300, as described above. Processes 100, 200, 300, and/or 400 may be implemented in network management equipment or base station equipment of such a communication network 302. For example, processes 100, 200, 300, and/or 400 may be implemented entirely (or partially) in the command layer with existing hardware, such as by being built into system hardware.

Figure 5:
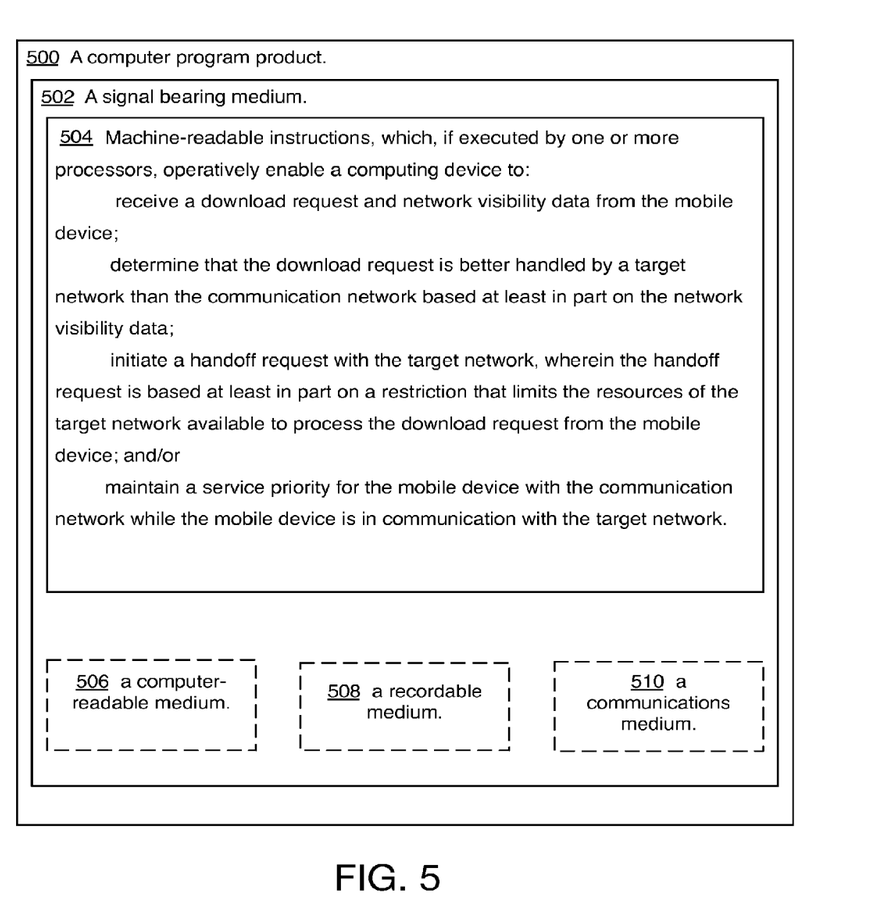
FIG. 5 is a block diagram of an illustrative embodiment of a computing device arranged in accordance with at least some embodiments of the present disclosure.

FIG. 5 illustrates an example computer program product 500 that is arranged in accordance with at least some examples of the present disclosure. Program product 500 may include a signal bearing medium 502. Signal bearing medium 502 may include one or more machine-readable instructions 504, which, if executed by one or more processors, may operatively enable a computing device to provide the functionality described above with respect to FIG. 1, FIG. 2, FIG. 3, and/or FIG. 4. Thus, for example, referring to the system of FIG. 3 one or more mobile devices 304 and/or mobile service providers 306 may undertake one or more of the actions shown in FIG. 1, FIG. 2, FIG. 3, and/or FIG. 4 in response to instructions 504 conveyed by medium 502.

In some implementations, signal bearing medium 502 may encompass a non-transitory computer-readable medium 506, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass communications medium 510, such as, but not limited to, a digital and/or an analog communication medium (e.g., a fiber optic cable, a waveguide, a wired communications link, a wireless communication link, etc.).

Figure 6:
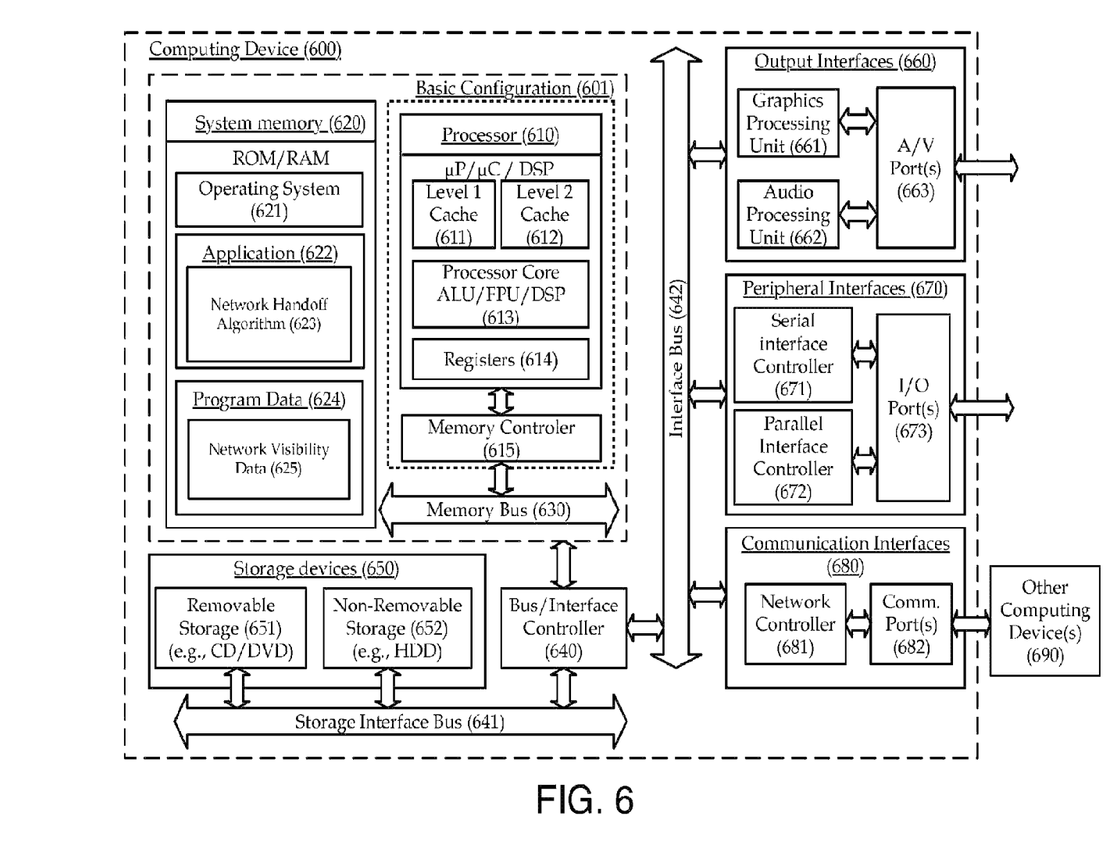
FIG. 6 is a schematic diagram of an illustrative embodiment of a computing device arranged in accordance with at least some embodiments of the present disclosure.

FIG. 6 is a block diagram illustrating an example computing device 600, such as might be embodied by a person skilled in the art, which is arranged in accordance with at least some embodiments of the present disclosure. In one example configuration 601, computing device 600 may include one or more processors 610 and system memory 620. A memory bus 630 may be used for communicating between the processor 610 and the system memory 620.

Depending on the desired configuration, processor 610 may be of any type including but not limited to a microprocessor (µP), a microcontroller (µC), a digital signal processor (DSP), or any combination thereof. Processor 610 may include one or more levels of caching, such as a level one cache 611 and a level two cache 612, a processor core 613, and registers 614. The processor core 613 may include an arithmetic logic unit (ALU), a floating point unit (FPU), a digital signal processing core (DSP Core), or any combination thereof. A memory controller 615 may also be used with the processor 610, or in some implementations the memory controller 615 may be an internal part of the processor 610.

Depending on the desired configuration, the system memory 620 may be of any type including but not limited to volatile memory (such as RAM), non-volatile memory (such as ROM, flash memory, etc.) or any combination thereof. System memory 620 may include an operating system 621, one or more applications 622, and program data 624. Application 622 may include a network handoff algorithm 623 in a communication network that is arranged to perform the functions as described herein including the functional blocks and/or actions described with respect to process 100 of FIG. 1, process 200 of FIG. 2, process 300 of FIG. 3, and/or process 400 of FIG. 4. Program Data 624 may include network visibility data 625 for use with network handoff algorithm 623. In some example embodiments, application 622 may be arranged to operate with program data 624 on an operating system 621 such that implementations of maintaining service priority for mobile devices during network handoffs based at least in part on network visibility data 625 may be provided as described herein. For example, one or more mobile devices 304 and/or mobile service providers 306 may comprise all or a portion of computing device 600 and be capable of performing all or a portion of application 622 such that implementations of maintaining service priority for mobile devices during network handoffs may be provided as described herein. This described basic configuration is illustrated in FIG. 6 by those components within dashed line 601.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of device 600.

Computing device 600 may also include an interface bus 642 for facilitating communication from various interface devices (e.g., output interfaces, peripheral interfaces, and communication interfaces) to the basic configuration 601 via the bus/interface controller 640. Example output interfaces 660 may include a graphics processing unit 661 and an audio processing unit 662, which may be configured to communicate to various external devices such as a display or speakers via one or more A/V ports 663. Example peripheral interfaces 670 may include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which may be arranged to facilitate communications with one or more other computing devices 690 over a network communication via one or more communication ports 682. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. In addition, computing device 600 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed is:

1. A method implemented in a communication network associated with a mobile device, comprising:
   receiving a download request and network visibility data from the mobile device;
   determining that the download request is better handled by a target network than the communication network based at least in part on the network visibility data;
   initiating a handoff request with the target network;
   placing a restriction on one or more resources of the target network available to process the download request from the mobile device, wherein the restriction includes one or more of a limit on duration of time available to process the download request, a limit on a size of file that may be downloaded, a limit on a data rate available to process the download request, or a limit on services available on the target network that may be accessed; and
   maintaining a service priority for the mobile device with the communication network while the mobile device is in communication with the target network,
   wherein the handoff request comprises a pre-reversed handoff request including a first portion designating a forward handoff from the communication network to the target network, and a second portion designating a reverse handoff from the target network to the communication network, the second portion being based at least in part on the restriction on one or more resources of the target network.

2. The method of claim 1, wherein the initiating of the pre-reversed handoff request with the target network is sent directly from the communication network to the target network.

3. The method of claim 1, wherein the initiating of the pre-reversed handoff request with the target network is sent from the communication network to the target network via the mobile device.

4. The method of claim 1, wherein the network visibility data includes one or more of received signal strength and network type.

5. The method of claim 1, wherein determining that the download request is better handled by the target network is further based at least in part on data associated with the download request, wherein the data associated with the download request includes one or more of file type of the download request and file size of the download request.

6. The method of claim 1, wherein the maintaining a service priority for the mobile device with the communication network is based at least in part on the communication network operating network admissions and controls as if the mobile device were present on the communication network while inactive and retaining information associated with the mobile device including one or more of a validation associated with the mobile device and an address associated with the mobile device.

7. The method of claim 1, further comprising:
receiving a reactivate connection request to reactivate an inactive connection between the mobile device and the communication network based at least in part on the maintained service priority, wherein the reactivate connection request is triggered based in part on a download from the target network to the mobile device completing; and
reactivating the inactive connection between the mobile device and the communication network based at least in part on the received reactivate connection request.

8. The method of claim 7, wherein the reactivate connection request is received directly from the target network.

9. The method of claim 7, wherein the reactivate connection request is received via the mobile device.

10. The method of claim 1, further comprising:
transferring service for the mobile device from a first node of the communication network to a second node of the communication network via a horizontal handoff, the transfer of service occurring at least during the maintaining of the service priority for the mobile device with the communication network.

11. A method implemented in a communication network associated with a mobile device, comprising:
receiving a download request and network visibility data from the mobile device;
determining that the download request is better handled by a target network than the communication network based at least in part on the network visibility data;
initiating a handoff request with the target network, wherein the target network prohibits the mobile device from having long-term occupancy on the target network;
placing a restriction on one or more resources of the target network available to process the download request from the mobile device, wherein the restriction includes one or more of a limit on a duration of time available to process the download request, a limit on a size of file that may be downloaded, a limit on a data rate available to process the download request, or a limit on services available on the target network that may be accessed; and
maintaining a service priority for the mobile device with the communication network while the mobile device is in communication with the target network,
wherein the handoff request comprises a pre-reversed handoff request including a first portion designating a forward handoff from the communication network to the target network, and a second portion designating a reverse handoff from the target network to the communication network, the second portion being based at least in part on the restriction on one or more resources of the target network.

12. A method implemented in a mobile device associated with a communication network, comprising:
determining, via the mobile device, that a download request is better handled by a target network than the communication network based at least in part on network visibility data available to the mobile device;
initiating, via the mobile device, a handoff request with the target network;
placing, via the mobile device, a restriction on one or more resources of the target network available to process the download request from the mobile device, wherein the restriction includes one or more of a limit on a duration of time available to process the download request, a limit on a size of file that may be downloaded, a limit on a data rate available to process the download request, or a limit on services available on the target network that may be accessed; and
transmitting, via the mobile device, a beacon signal to maintain a service priority for the mobile device with the communication network while the mobile device is in communication with the target network,
wherein the handoff request comprises a pre-reversed handoff request including a first portion designating a forward handoff from the communication network to the target network, and a second portion designating a reverse handoff from the target network to the communication network, the second portion being based at least in part on the restriction on one or more resources of the target network.

13. The method of claim 12, wherein the target network prohibits the mobile device from having long-term occupancy on the target network.

14. The method of claim 12, further comprising sending a reactivate connection request to reactivate an inactive connection between the mobile device and the communication network based at least in part on the maintained service priority, wherein the reactivate connection request is triggered based in part on a download from the target network to the mobile device completing.

15. The method of claim 12, further comprising:
receiving transferred service for the mobile device from a first node of the communication network to a second node of the communication network via a horizontal handoff, the transfer of service occurring at least during the maintaining of the service priority for the mobile device with the communication network.

16. A communication network, comprising:
a mobile service provider configured to facilitate communication in the communication network associated with a mobile device, the mobile service provider configured to:
receive a download request and network visibility data from the mobile device;
determine that the download request is better handled by a target network than the communication network based at least in part on the network visibility data;
initiate a handoff request with the target network;
place a restriction on one or more resources of the target network available to process the download request from the mobile device, wherein the restriction includes one or more of a limit on a duration of time available to process the download request, a limit on a size of file that may be downloaded, a limit on a data rate available to process the download request, or a limit on services available on the target network that may be accessed; and maintain a service priority for the mobile device with the communication network while the mobile device is in communication with the target network, wherein the handoff request comprises a pre-reversed handoff request including a first portion designating a forward handoff from the communication network to the target network, and a second portion designating a reverse handoff from the target network to the communication network, the second portion being based at least in part on the restriction on one or more resources of the target network.

17. An article comprising:
a non-transitory signal bearing medium comprising machine-readable instructions stored thereon, which, if executed by one or more processors, operatively enable a computing device to:

receive a download request and network visibility data from a mobile device;

determine that the download request is better handled by a target network than a communication network based at least in part on the network visibility data;

initiate a handoff request with the target network;

place a restriction on one or more resources of the target network available to process the download request from the mobile device wherein the restriction includes one or more of a limit on a duration of time available to process the download request, a limit on a size of file that may be downloaded, a limit on a data rate available to process the download request, or a limit on services available on the target network that may be accessed; and maintain a service priority for the mobile device with the communication network while the mobile device is in communication with the target network, wherein the handoff request comprises a pre-reversed handoff request including a first portion designating a forward handoff from the communication network to the target network, and a second portion designating a reverse handoff from the target network to the communication network, the second portion being based at least in part on the restriction on one or more resources of the target network.

* * * * *

UNITED STATES PATENT AND TRADEMARK OFFICE
CERTIFICATE OF CORRECTION

| | | |
|---|---|---|
| PATENT NO. | : 8,902,853 B2 | Page 1 of 1 |
| APPLICATION NO. | : 13/266104 | |
| DATED | : December 2, 2014 | |
| INVENTOR(S) | : Kruglick | |

It is certified that error appears in the above-identified patent and that said Letters Patent is hereby corrected as shown below:

Title Page:

On Page 2, item (56), References Cited under "OTHER PUBLICATIONS", in Column 2, Line 1, delete "E et" and insert -- E. et --, therefor.

In the Drawings:

In Fig. 6, Sheet 6 of 6, in Box "(615)", in Line 1, delete "Controler" and insert -- Controller --, therefor.

In the Specification:

In Column 1, below Title, insert -- CROSS-REFERENCE TO RELATED APPLICATION
The present application is a U.S. national stage filing under 35 U.S.C. §371 of International Application No. PCT/US2011/038316, filed on May 27, 2011, which is incorporated herein by reference. --.

In Column 16, Line 24, delete "and or" and insert -- and/or --, therefor.

In the Claims:

In Column 18, Line 44, in Claim 1, delete "duration" and insert -- a duration --, therefor.

Signed and Sealed this
Thirtieth Day of June, 2015

Michelle K. Lee
*Director of the United States Patent and Trademark Office*